(12) United States Patent
Wei

(10) Patent No.: US 8,867,207 B2
(45) Date of Patent: Oct. 21, 2014

(54) RACK-MOUNT SERVER SYSTEM

(71) Applicant: Chao-Ke Wei, New Taipei (TW)

(72) Inventor: Chao-Ke Wei, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 170 days.

(21) Appl. No.: 13/663,496

(22) Filed: Oct. 30, 2012

(65) Prior Publication Data

US 2014/0049907 A1 Feb. 20, 2014

(30) Foreign Application Priority Data

Aug. 17, 2012 (CN) .................... 2012 1 0293706

(51) Int. Cl.
*H05K 7/20* (2006.01)

(52) U.S. Cl.
USPC ............... 361/695; 361/679.49; 361/679.51; 454/184

(58) Field of Classification Search
USPC .............. 361/676–678, 679.46–679.54, 361/688–722, 752, 831
See application file for complete search history.

(56) References Cited

U.S. PATENT DOCUMENTS

| | | | |
|---|---|---|---|
| 7,643,281 B2 * | 1/2010 | Okamoto et al. | 361/679.33 |
| 7,894,191 B2 * | 2/2011 | Tsuchiya | 361/695 |
| 8,462,495 B1 * | 6/2013 | Keefe et al. | 361/679.46 |
| 8,503,179 B2 * | 8/2013 | Tan et al. | 361/696 |
| 2002/0126449 A1 * | 9/2002 | Casebolt | 361/687 |
| 2004/0160720 A1 * | 8/2004 | Yamanashi et al. | 361/103 |
| 2005/0259397 A1 * | 11/2005 | Bash et al. | 361/699 |
| 2008/0218949 A1 * | 9/2008 | Hughes | 361/679 |
| 2009/0016019 A1 * | 1/2009 | Bandholz et al. | 361/695 |
| 2011/0292602 A1 * | 12/2011 | Narasimhan et al. | 361/692 |
| 2013/0163194 A1 * | 6/2013 | Shih et al. | 361/679.48 |
| 2013/0231039 A1 * | 9/2013 | Nagasaka | 454/184 |

\* cited by examiner

*Primary Examiner* — Courtney Smith
(74) *Attorney, Agent, or Firm* — Novak Druce Connolly Bove + Quigg LLP

(57) ABSTRACT

A rack-mounted server system includes a rack, a number of server units mounted in the rack adjacent to a front end of the rack, a fan module, and a number of power units located beside the server units. The rack includes a back wall defining an air outlet aligned with the server units. The fan module is fixed to the back wall and fitted in the air outlet. The power units are arranged in front of the fan module. An air-guide plate is mounted in the rack between the fan module and the power units to guide a part of the airflow generated by the fan module to flow through the power units.

6 Claims, 2 Drawing Sheets

RACK-MOUNT SERVER SYSTEM

BACKGROUND

1. Technical Field

The present disclosure relates to a rack-mount server system.

2. Description of Related Art

A rack-mount server system includes a rack, a plurality of server units slidably mounted to the rack, a fan module attached to a rear side of the rack for heat dissipation of the server units, and a plurality of power units received in the rack to supply power to the server units. Traditionally, each of the power units can be self-cooled with a fan included in the power unit. However, heat-dissipation capacity of the fan of the power unit is limited by the size of the power unit. Therefore, the power unit may not be self-cooled effectively with the increasing output power of the power unit.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION OF THE DESCRIPTION

Figure 1:
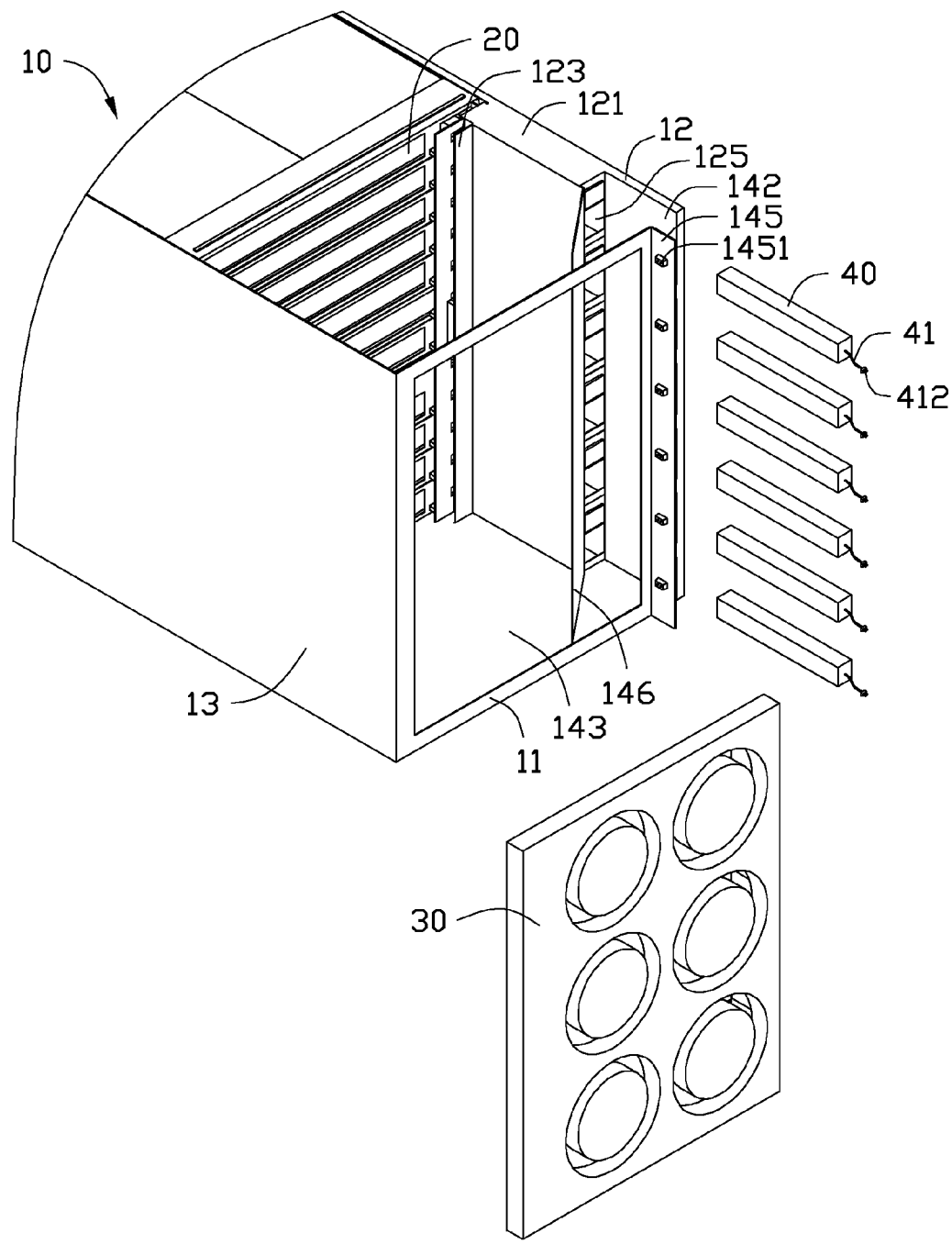
FIG. 1 is an exploded, isometric view of an embodiment of a rack-mount server system.
Figure 2:
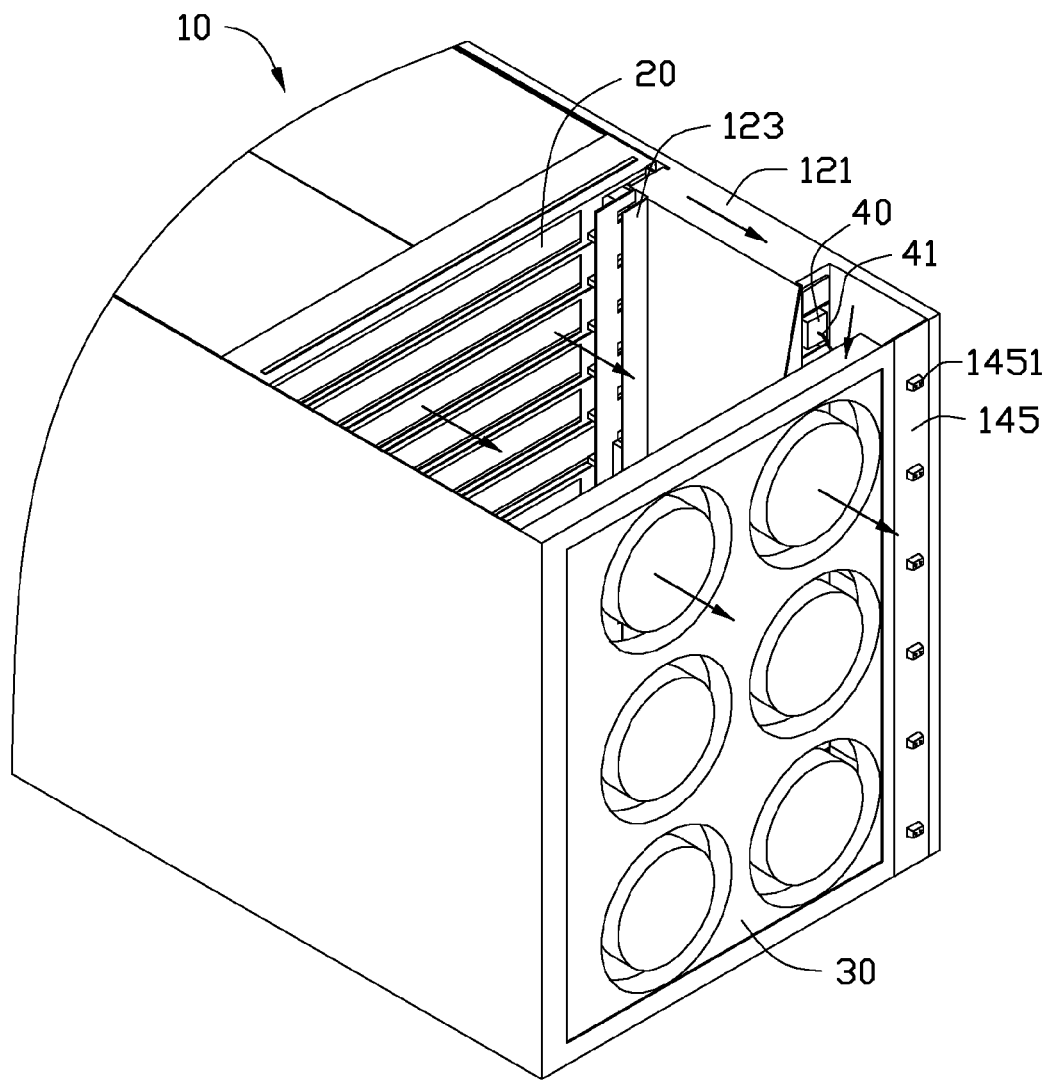
FIG. 2 is an assembled, isometric view of FIG. 1.

Referring to FIGS. 1 and 2, a first embodiment of a rack-mount server system includes a rack 10, a plurality of server units 20 mounted in the rack 10 adjacent to a front side of the rack 10, a fan module 30, and a plurality of power units 40.

The rack 10 includes a first sidewall 12, a second sidewall 13 opposite to the first sidewall 12, a back wall 11 perpendicularly extending from a rear side of the second sidewall 13 towards the first sidewall 12. The back wall 11 is separated from the first sidewall 12 to define an access 142 between the back wall 11 and the first sidewall 12. A door 145 is rotatably connected to a side of the back wall 11 adjacent to the first sidewall 12. The back wall 11 defines an air outlet 143. A plurality of converters 1451 is mounted to the door 145 and arranged along a height direction of the door 145. A mounting bracket 121 is mounted in the rack 10 behind the server units 20, and aligned with the access 142. A switchboard 123 is mounted in a front side of the mounting bracket 121 and electrically connected to the server units 20. The mounting bracket 121 defines a plurality of accommodating spaces 125 arranged along a height direction of the mounting bracket 121 to correspondingly receive the power units 40.

An air-guide plate 146 is mounted between the rear wall 11 and the mounting bracket 121, and slanting from a middle of the rear wall 11 toward the rear end of the mounting bracket 121.

Each of the power units 40 includes a connector (not shown) at a front end of the power unit 40 and a power cord 41 extending from a rear end of the power unit 40. A plug 412 is mounted to a distal end of each of the power cords 41.

In assembly, the fan module 30 is fixed to the rear wall 11 and embedded in the air outlet 143. The door 145 is rotated to uncover the access 142. The power units 40 are inserted into the accommodating spaces 125 of the mounting bracket 121 through the access 142, and arranged in front of the fan module 30. The connectors of the power units 40 are electrically connected to the switchboard 123. The plugs 412 of the power cords 41 of the power units 40 are engaged with the corresponding converters 1451. The door 145 is rotated to cover the access 142. The commercial power is connected to the converter 1451 to supply power to the rack-mount server system.

In operation of the rack-mount server system, the fan module 30 draws an airflow (illustrated by arrows in FIG. 2) into the rack 10 from the front end of the rack 10 to dissipate heat generated by the server units 20, and exhausts the airflow out of the rack 10 through the air outlet 143. A part of the airflow produced by the fan module 30 is guided to the power units 40 by the air-guide plate 146, to cool the power units 40. Therefore, heat dissipation of the power units 40 is more effective with the fan module 30 than through self-cooling.

It is to be understood, however, that even though numerous characteristics and advantages of the present disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A rack-mount server system, comprising:
a rack comprising a back wall defining an air outlet;
a plurality of server units mounted in the rack, spaced from the back wall, and aligned with the air outlet;
a fan module attached to the back wall and fitted in the air outlet;
a plurality of power units mounted in the rack beside the server units and in front of the fan module; and
an air-guide plate mounted in the rack and arranged between the fan module and the power units to guide part of airflow produced by the fan module to flow through the power units.

2. The rack-mount server system of claim 1, wherein the rack further comprises a first sidewall and a second sidewall parallel to the first sidewall, the back wall perpendicularly extends from the second sidewall towards the first sidewall, the back wall is separated from the first sidewall to define an access between the back wall and the first sidewall, the power units are arranged adjacent to the first sidewall and aligned with the access.

3. The rack-mount server system of claim 2, wherein the rack further comprises a door rotatably connected to a side of the back wall adjacent to the first sidewall to cover or uncover the access.

4. The rack-mount server system of claim 3, wherein a plurality of converters is mounted to the door, and electrically connected to the power units, respectively.

5. The rack-mount server system of claim 2, further comprising a mounting bracket mounted in the rack to support the power units, wherein the air-guide plate slantingly extends from a rear end of the mounting bracket towards a middle of the fan module.

6. The rack-mount server system of claim 5, further comprising a switchboard electrically connected to the power units and the server units.

* * * * *